No. 783,843. PATENTED FEB. 28, 1905.
F. C. MILBURN.
BRAKE.
APPLICATION FILED OCT. 5, 1904.
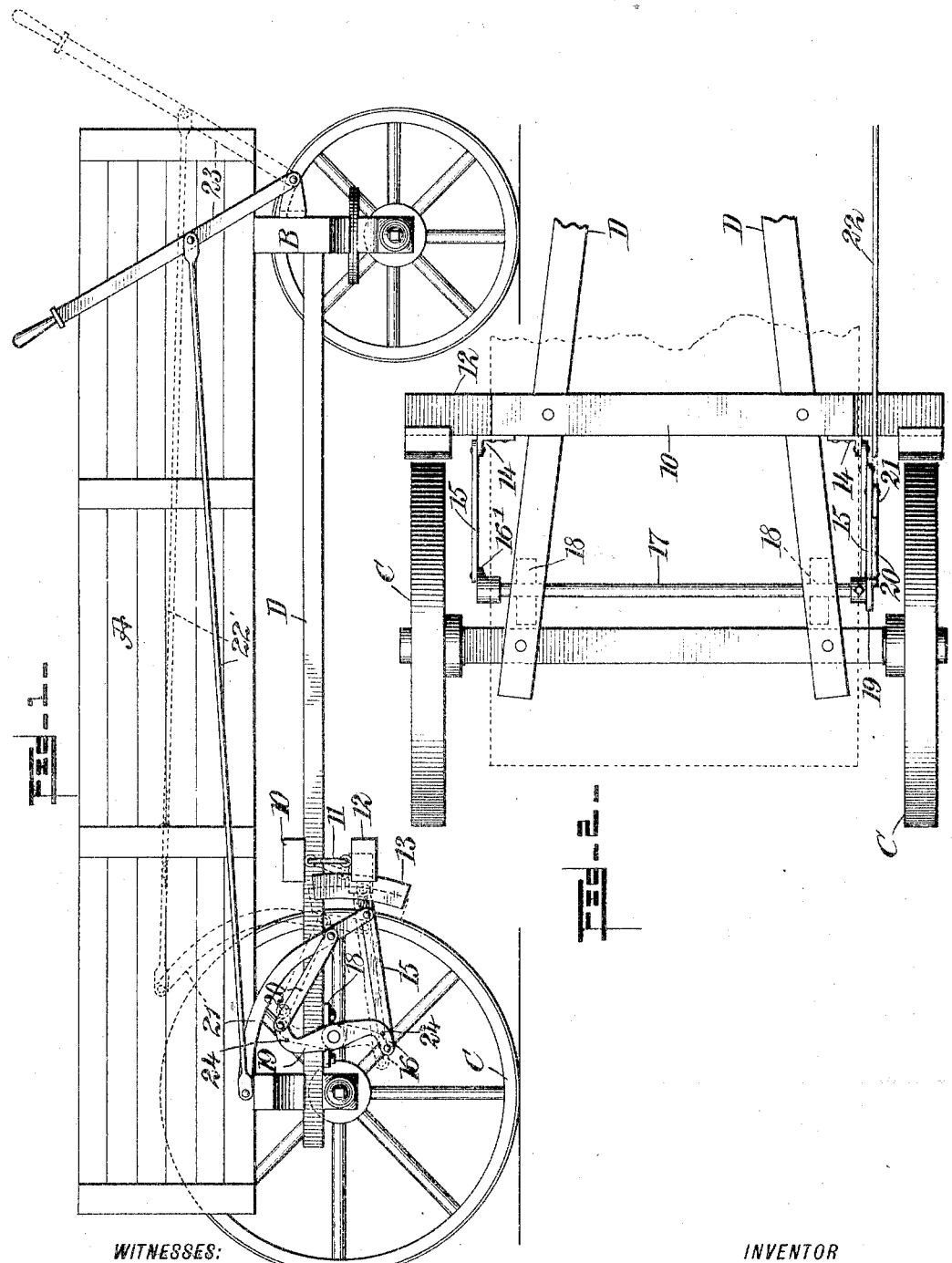
WITNESSES:
INVENTOR
Fred C. Milburn
BY
ATTORNEYS No. 783,843.

Patented February 28, 1905.

UNITED STATES PATENT OFFICE.

FRED CLARKE MILBURN, OF BRADFORDSVILLE, KENTUCKY.

BRAKE.

SPECIFICATION forming part of Letters Patent No. 783,843, dated February 28, 1905.

Application filed October 5, 1904. Serial No. 227,228.

*To all whom it may concern:*

Be it known that I, FRED CLARKE MILBURN, a citizen of the United States, and a resident of Bradfordsville, in the county of Marion and State of Kentucky, have invented a new and Improved Brake, of which the following is a full, clear, and exact description.

My invention relates to brakes, and is especially adapted for use upon wagons.

It has for its principal objects the provision of a simple and effective mechanism for this purpose.

It consists in the various features and combinations hereinafter described and more particularly claimed.

Reference is to be had to the accompanying drawings, forming a part of this specification, in which similar characters of reference indicate corresponding parts in both figures.

Figure 1 shows a side elevation of a wagon to which one embodiment of my invention is applied; and Fig. 2 is a top plan view of the rear portion thereof, the wagon-body being indicated by dotted lines.

A designates a wagon the bolster B of which is connected to the axle of the rear wheels C by the usual reach D. Upon the reach is mounted a cross-bar 10, near each end of which are pivoted links 11, having suspended upon them a brake-beam 12. At each extremity of the brake-beam is fixed a shoe 13 for coaction with the wheels C. Secured to the brake-beam are brackets 14 14, which are connected by links 15 with rock-arms 16 16', depending from points near opposite ends of a rod or shaft 17, which is shown as rotatable in bearings 18, fixed upon the under side of the reach. Extending oppositely to and in substantial alinement with the arm 16 is a similar arm 19, to which is articulated a link 20, joining the arm, and a lever 21, which is also pivoted at its lower extremity to the adjacent link 15. To the upper end of the lever may be joined a rod 22, connecting with a hand-lever 23, conveniently fulcrumed near the forward end of the wagon. The arms 16 and 19 may be curved in opposite directions, the end portions extending almost horizontally and having a plurality of openings 24, to which the links 15 and 20 are connected by pins. This permits a variation in the relation between the elements without sensibly increasing the strain. The lever 21 is shown as bent rearwardly, so that when the brake is not applied it may rest upon the rear bolster.

It will be seen that a forward pull upon the hand-lever, or the lever 21, to which it is connected, will thrust the link 15 rearwardly and the link 20 forwardly, the former acting directly to simultaneously move both ends of the brake-beam toward the rear wheels and set the shoes in contact therewith, while the latter exerts its force through the arms 16 and 19 to the same end.

This structure presents many advantages. It may be readily applied to any type of wagon, whether high or low, and the operating-lever may be attached to either end of the actuating-shaft. The brake-beam cannot slip sidewise when the wagon is on inclined ground, since it is held against lateral movement by the links 15. If the brake shoes or beam happen to strike any obstacle, they merely move rearwardly toward the wheels, raising the levers until the obstacle has been passed. As the thrust upon the brake-beam is distributed over both ends, it may be made of comparatively light material and yet be amply strong. The mounting of the brake-beam is such that if one end of either brake-shoe touches the wheel first the structure will swing and adjust itself to contact over the entire surface of the shoes. Obviously the levers may be made of any desired length to give the proper amount of force of application.

Having thus described my invention, I claim as new and desire to secure by Letters Patent—

1. The combination with a wagon, of a shaft rotatably mounted thereon, oppositely-projecting arms fixed to the shaft, links pivoted to the arms, a lever joining the links, and a brake-shoe connected with one of the links.

2. The combination with a wagon, of a shaft rotatably mounted thereon, arms extending upon opposite sides of the shaft near one end, an arm fixed to the shaft near the opposite end, a brake-beam, links connecting both ends of the brake-beam with the shaft-arms, a lever pivoted to one of the links, and a link joining the lever and oppositely-projecting shaft-arm.

3. The combination with a wagon, of links depending therefrom, a brake-beam supported upon the links, rock-arms mounted upon the wagon, links pivoted to the rock-arms, one of the links being connected with the brake-beam, and a lever joining the rock-arm links.

In testimony whereof I have signed my name to this specification in the presence of two subscribing witnesses.

FRED CLARKE MILBURN.

Witnesses:
    Don V. Drye,
    C. H. Bateman.